United States Patent
Sugiyama et al.

(10) Patent No.: US 8,901,264 B2
(45) Date of Patent: Dec. 2, 2014

(54) COPOLYMER AND METHOD FOR PRODUCING THE SAME

(75) Inventors: Kazunori Sugiyama, Tokyo (JP); Toyomichi Shimada, Tokyo (JP); Nobuyuki Otozawa, Tokyo (JP); Yuuichi Oomori, Tokyo (JP); Minako Shimada, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 12/878,045

(22) Filed: Sep. 9, 2010

(65) Prior Publication Data

US 2010/0331479 A1 Dec. 30, 2010

Related U.S. Application Data

(63) Continuation of application No. PCT/JP2009/054692, filed on Mar. 11, 2009.

(30) Foreign Application Priority Data

Mar. 12, 2008 (JP) ................................. 2008-062541

(51) Int. Cl.
| | | |
|---|---|---|
| C08F 214/26 | (2006.01) | |
| C08F 214/08 | (2006.01) | |
| C08F 220/24 | (2006.01) | |
| C08F 214/00 | (2006.01) | |
| C08F 214/06 | (2006.01) | |
| C08F 220/18 | (2006.01) | |
| C08F 220/26 | (2006.01) | |

(52) U.S. Cl.
CPC ............. *C08F 214/00* (2013.01); *C08F 220/26* (2013.01); *C08F 214/08* (2013.01); *C08F 220/24* (2013.01); *C08F 214/06* (2013.01); *C08F 220/18* (2013.01)
USPC ........... 526/255; 526/242; 526/245; 526/246; 526/247; 526/329.4; 526/329.5; 526/329.6; 526/343; 526/345; 524/714; 524/755; 524/805; 524/832; 524/834; 428/421

(58) Field of Classification Search
USPC ........ 526/242, 245, 247, 329.4, 329.5, 329.6, 526/343, 345; 524/832, 834
See application file for complete search history.

(56) References Cited

U.S. PATENT DOCUMENTS

| | | | |
|---|---|---|---|
| 5,344,903 A * | 9/1994 | Raiford et al. ................. | 526/245 |
| 6,177,531 B1 * | 1/2001 | Shimada et al. .............. | 526/245 |
| 6,716,944 B2 | 4/2004 | Maekawa et al. | |
| 6,774,176 B1 * | 8/2004 | Nzudie et al. ................. | 524/544 |
| 7,015,275 B1 * | 3/2006 | Aga et al. ...................... | 524/544 |
| 2003/0130457 A1 | 7/2003 | Maekawa et al. | |
| 2005/0211945 A1 * | 9/2005 | Coppens et al. ............. | 252/8.57 |
| 2007/0088141 A1 | 4/2007 | Kashiwagi | |
| 2010/0069564 A1 | 3/2010 | Shimada et al. | |
| 2010/0087597 A1 * | 4/2010 | Shimada et al. .............. | 524/755 |

FOREIGN PATENT DOCUMENTS

| | | | |
|---|---|---|---|
| EP | 1298180 A1 * | 4/2003 | |
| JP | 63-54411 | 3/1988 | |
| JP | 03-88804 | 4/1991 | |
| JP | 09-183806 | 7/1997 | |
| JP | 10-114847 | 5/1998 | |
| WO | 02/083809 | 10/2002 | |
| WO | WO 2008022985 A1 * | 2/2008 | |
| WO | 2008/136435 | 11/2008 | |
| WO | 2008/136436 | 11/2008 | |
| WO | 2008/153075 | 12/2008 | |
| WO | WO 2009000370 A1 * | 12/2008 | |

OTHER PUBLICATIONS

Derwent Abstract of JP 63054411 A.*
Extended European Search Report issued on Feb. 14, 2011, in corresponding European Application No. 09719086.2.

* cited by examiner

*Primary Examiner* — Nicole M Buie-Hatcher
(74) *Attorney, Agent, or Firm* — Oblon, Spivak, McClelland, Maier & Neustadt, L.L.P.

(57) ABSTRACT

To provide a copolymer which can impart sufficient dynamic water repellency, after air-drying water repellency and friction durability to a surface of an article, and which has low impact on the environment, a method for producing the same, a water repellent composition and an article excellent in dynamic water repellency, after air-drying water repellency and friction durability. A copolymer which is characterized in that it has structural units based on the following monomer (a) and structural units based on the following monomer (b), wherein the content of structural units based on the monomer (a) is from 5 to 95 mass % in the total structural units (100 mass %), the content of structural units based on the monomer (b) is from 5 to 60 mass % in the total structural units (100 mass %) and the sum of the contents of structural units based on the monomer (a) and structural units based on the monomer (b) is at least 65 mass % in the total structural units (100 mass %), and a water repellent composition which comprises the copolymer: Monomer (a): a (meth)acrylate having no $R^f$ group and having a $C_{20-30}$ alkyl group; Monomer (b): a halogenated olefin.

13 Claims, No Drawings

COPOLYMER AND METHOD FOR PRODUCING THE SAME

TECHNICAL FIELD

The present invention relates to a copolymer, a method for producing the same, a water repellent composition which comprises the copolymer and an article treated with the water repellent composition.

BACKGROUND ART

A method of treating an article (e.g. a fiber product) with a water/oil repellent composition comprising an emulsion having a copolymer, which has structural units based on a monomer having a polyfluoroalkyl group (hereinafter referred to as a $R^f$ group) having at least 8 carbon atoms, dispersed in a medium, has been known as a method for imparting water repellency to a surface of the article.

However, recently, EPA (United States Environmental Protection Agency) has pointed out that a compound having a perfluoroalkyl group (hereinafter referred to as a $R^F$ group) having at least 8 carbon atoms is decomposed in the environment or a living body, and its decomposition product is accumulated there, which means that such a compound has a major impact on the environment. Accordingly, a copolymer for a water/oil repellent composition, is required which has structural units based on a monomer having a $R^f$ group having at most 6 carbon atoms and which has structural units based on a monomer having a $R^F$ group having at least 8 carbon atoms reduced as much as possible.

As a water/oil repellent composition containing such a copolymer, the following water/oil repellent composition has, for example, been proposed.

A water/oil repellent composition essentially containing a copolymer which substantially comprises structural units based on the following monomer (A) and structural units based on the following monomer (B) (Patent Document 1):

Monomer (A): e.g. a monomer which has a $R^F$ group having at most 6 carbon atoms;

Monomer (B): e.g. a (meth)acrylate which has an alkyl group having at least 15 carbon atoms.

However, an article treated with such a water/oil repellent composition is insufficient in water repellency to water (rainfall) fallen from a high altitude (hereinafter referred to as dynamic water repellency), water repellency after drying without compulsory heating after washing (hereinafter referred to as after air-drying water repellency) and water repellency after friction (hereinafter referred to as friction durability).

Patent Document 1: WO02/083809

DISCLOSURE OF THE INVENTION

Object to be Accomplished by the Invention

The present invention is to provide a copolymer which can impart sufficient dynamic water repellency, after air-drying water repellency and friction durability to a surface of an article, and which has low impact on the environment, a method for producing the same, a water repellent composition and an article excellent in dynamic water repellency, after air-drying water repellency and friction durability.

Means to Accomplish the Object

The copolymer of the present invention is characterized in that it has structural units based on the following monomer (a) and structural units based on the following monomer (b), wherein the content of structural units based on the monomer (a) is from 5 to 95 mass % in the total structural units (100 mass %), the content of structural units based on the monomer (b) is from 5 to 60 mass % in the total structural units (100 mass %) and the sum of the contents of structural units based on the monomer (a) and structural units based on the monomer (b) is at least 65 mass % in the total structural units (100 mass %):

Monomer (a): a (meth)acrylate having no $R^f$ group and having a $C_{20\text{-}30}$ alkyl group;

Monomer (b): a halogenated olefin.

The copolymer of the present invention preferably further has structural units based on the following monomer (c):

Monomer (c): a monomer having a $R^f$ group.

The monomer (c) is preferably a compound of the following formula (1):

$$(Z-Y)_nX \quad (1)$$

wherein Z is a $C_{1\text{-}6}$ $R^f$ group or a group of the following formula (2), Y is a bivalent organic group or a single bond, n is 1 or 2, and X is one of groups of the following formulae (3-1) to (3-5) when n is 1, or one of groups of the following formulae (4-1) to (4-4) when n is 2;

$$C_iF_{2i+1}O(CFX^1CF_2O)_jCFX^2— \quad (2)$$

wherein i is an integer of from 1 to 6, j is an integer of from 0 to 10, and each of $X^1$ and $X^2$ is a fluorine atom or a trifluoromethyl group;

$$-CR=CH_2 \quad (3\text{-}1)$$

$$-COOCR=CH_2 \quad (3\text{-}2)$$

$$-OCOCR=CH_2 \quad (3\text{-}3)$$

$$-OCH_2\text{-}\phi\text{-}CR=CH_2 \quad (3\text{-}4)$$

$$-OCH=CH_2 \quad (3\text{-}5)$$

wherein R is a hydrogen atom, a methyl group or a halogen atom, and φ is a phenylene group;

$$-CH[-(CH_2)_m-CR=CH_2]- \quad (4\text{-}1)$$

$$-CH[-(CH_2)_m-COOCR=CH_2]- \quad (4\text{-}2)$$

$$-CH[-(CH_2)_m-OCOCR=CH_2]- \quad (4\text{-}3)$$

$$-OCOCH=CHCOO- \quad (4\text{-}4)$$

wherein R is a hydrogen atom, a methyl group or a halogen atom, and m is an integer of from 0 to 4.

The content of structural units based on the monomer (c) is preferably from 1 to 35 mass % in the total structural units (100 mass %).

The monomer (b) is preferably vinyl chloride or vinylidene chloride.

The copolymer of the present invention preferably further has structural units based on the following monomer (d).

Monomer (d): A monomer having no polyfluoroalkyl group and having a crosslinkable functional group.

The method for producing a copolymer of the present invention is characterized in that it comprises polymerizing a monomer mixture comprising the monomer (a) and the monomer (b) in a medium in the presence of a surfactant and a polymerization initiator, wherein the content of the monomer (a) is from 5 to 95 mass % in the total monomers (100 mass %), the content of the monomer (b) is from 5 to 60 mass % in the total monomers (100 mass %) and the sum of the contents of the monomer (a) and the monomer (b) is at least 65 mass % in the monomer mixture (100 mass %).

The monomer mixture preferably further contains the monomer (c), and the content of the monomer (c) is from 1 to 35 mass % in the total monomers (100 mass %).

The monomer (b) is preferably vinyl chloride or vinylidene chloride.

The water repellent composition of the present invention comprises the copolymer of the present invention.

The article of the present invention is an article treated with the water repellent composition of the present invention.

Effects of the Invention

The copolymer of the present invention can impart sufficient dynamic water repellency, after air-drying water repellency and friction durability to a surface of an article, and has low impact on the environment.

By the method for producing a copolymer of the present invention, it is possible to produce a copolymer which can impart sufficient dynamic water repellency, after air-drying water repellency and friction durability to a surface of an article, and has low impact on the environment.

The water repellent composition of the present invention can impart sufficient dynamic water repellency, after air-drying water repellency and friction durability to a surface of an article, and has low impact on the environment.

The article of the present invention is excellent in dynamic water repellency, after air-drying water repellency and friction durability.

BEST MODE FOR CARRYING OUT THE INVENTION

In this specification, a compound represented by the formula (1) is referred to as a compound (1). Compounds represented by other formulae are referred to in the same manner. Further, in this specification, a group represented by formula (2) is referred to as a group (2). Groups represented by other formulae are referred to in the same manner. Further, a (meth)acrylate in this specification means an acrylate or a methacrylate. Further, a monomer in this specification means a compound having a polymerizable unsaturated group. Further, a $R^f$ group in this specification is a group having some or all of hydrogen atoms in an alkyl group substituted by fluorine atoms, and a $R^F$ group is a group having all of hydrogen atoms in an alkyl group substituted by fluorine atoms.

<Copolymer>

The copolymer of the present invention has structural units based on a monomer (a) and structural units based on a monomer (b), as essential structural units, and as the case requires, has structural units based on a monomer (c), structural units based on a monomer (d) or structural units based on a monomer (e).

(Monomer (a))

The monomer (a) is a (meth)acrylate having no $R^f$ group and having a $C_{20-30}$ alkyl group. When the alkyl group has at least 20 carbon atoms, dynamic water repellency and after air-drying water repellency become good. When the alkyl group has at most 30 carbon atoms, the melting point is relatively low, and handling is thereby easy.

The monomer (a) is preferably behenyl (meth)acrylate, particularly preferably behenyl acrylate.

(Monomer (b))

The monomer (b) is a halogenated olefin. By having structural units based on the monomer (b), the strength of a coating film made of the copolymer of the present invention will be improved, and the adhesive property of the coating film made of the copolymer of the present invention to a substrate will be improved.

The halogenated olefin may preferably be a chlorinated olefin or a fluorinated olefin, and may specifically be vinyl chloride, vinylidene chloride, tetrafluoroethylene or vinylidene fluoride. Considering its interaction with a substrate, vinyl chloride or vinylidene chloride is particularly preferred.

(Monomer (c))

The monomer (c) is a monomer having a $R^f$ group.

It is considered that the copolymer of the present invention shows excellent dynamic water repellency and after air-drying water repellency even in a case where it has no polymerized units based on the monomer (c), but in a case where it has polymerized units based on the monomer (c), the hydrophobicity of the copolymer increases, and it shows better durable water repellency.

The monomer (c) may preferably be a compound having a $C_{1-20}$ $R^f$ group or a partial structure having a linear or branched polyfluoroalkylene group bonded via an oxygen atom.

However, it is preferred that the copolymer of the present invention has no structural units based on the monomer having a $R^F$ group having at least 8 carbon atoms with a view to eliminating the possibility of containing e.g. perfluorooctanic acid (PFOA), of which the effects on the environment have been pointed out.

The monomer (c) may particularly preferably be a compound (1).

$$(Z-Y)_n X \tag{1}$$

Z is a $C_{1-6}$ $R^f$ group (the $R^f$ group may contain an etheric oxygen atom) or a group (2).

$$C_i F_{2i+1} O(CFX^1 CF_2 O)_j CFX^2- \tag{2}$$

wherein i is an integer of from 1 to 6, j is an integer of from 0 to 10, and each of $X^1$ and $X^2$ is a fluorine atom or a trifluoromethyl group.

The $R^f$ group is preferably a $R^F$ group. The $R^f$ group may have a linear or branched structure, preferably a linear structure.

The following groups may be mentioned as examples of Z:
$F(CF_2)_4-$,
$F(CF_2)_5-$,
$F(CF_2)_6-$,
$(CF_3)_2 CF(CF_2)_2-$,
$C_k F_{2k+1} O[CF(CF_3)CF_2 O]_h-CF(CF_3)-$, etc.,
wherein k is an integer of from 1 to 6, and h is an integer of from 0 to 10.

Y is a bivalent organic group or a single bond.

The bivalent organic group is preferably an alkylene group. The alkylene group may have a linear or branched structure. The alkylene group may have $-O-$, $-NH-$, $-CO-$, $-S-$, $-SO_2-$, $-CD^1=CD^2-$ (wherein each of $D^1$ and $D^2$ which are independent of each other, is a hydrogen atom or a methyl group), etc.

The following groups may be mentioned as examples of Y:
$-CH_2-$,
$-CH_2 CH_2-$,
$-(CH_2)_3-$,
$-CH_2 CH_2 CH(CH_3)-$,
$-CH=CH-CH_2-$,
$-S-CH_2 CH_2-$,
$-CH_2 CH_2-S-CH_2 CH_2-$,
$-CH_2 CH_2-SO_2-CH_2 CH_2-$, etc.

n is 1 or 2.

X is one of groups (3-1) to (3-5) when n is 1, and one of groups (4-1) to (4-4) when n is 2;

—CR=CH$_2$  (3-1)

—COOCR=CH$_2$  (3-2)

—OCOCR=CH$_2$  (3-3)

—OCH$_2$-φ-CR=CH$_2$  (3-4)

—OCH=CH$_2$  (3-5)

wherein R is a hydrogen atom, a methyl group or a halogen atom, and φ is a phenylene group;

—CH[—(CH$_2$)$_m$—CR=CH$_2$]—  (4-1)

CH[—(CH$_2$)$_m$—COOCR=CH$_2$]—  (4-2)

—CH[—(CH$_2$)$_m$—OCOCR=CH$_2$]—  (4-3)

—OCOCH=CHCOO—  (4-4)

wherein R is a hydrogen atom, a methyl group or a halogen atom, and m is an integer of from 0 to 4.

The compound (1) is preferably a (meth)acrylate having a C$_{4-6}$ R$^f$ group, from the viewpoint of polymerizability with other monomers, flexibility of a coating film of the copolymer, adhesive property of the copolymer to an article, solubility in a medium, easiness of emulsion polymerization, etc.

The compound (1) may preferably be a compound wherein Z is a C$_{4-6}$ R$^f$ group, Y is a C$_{1-4}$ alkylene group, n is 1, and X is the group (3-3).

(Monomer (d))

The monomer (d) is a monomer having no R$^f$ group and having a crosslinkable functional group.

When polymer (A) has polymerized units based on the monomer (d), the friction durability will be further improved.

The crosslinkable functional group is preferably a functional group having at least one bond selected from a covalent bond, an ionic bond and a hydrogen bond, or a functional group which is capable of forming a crosslinked structure by interaction between such bonds.

Such a functional group may preferably be an isocyanate group, a blocked isocyanate group, an alkoxysilyl group, an amino group, an alkoxymethylamide group, a silanol group, an ammonium group, an amide group, an epoxy group, a hydroxy group, an oxazoline group, a carboxyl group, an alkenyl group or a sulfonic acid group, particularly preferably a hydroxy group, a blocked isocyanate group, an amino group or an epoxy group.

The monomer (d) is preferably a (meth)acrylate, an acryl amide, a vinyl ether or a vinyl ester.

As the monomer (d), the following compounds may be mentioned:

2-isocyanate ethyl (meth)acrylate, 3-isocyanate propyl (meth)acrylate, 4-isocyanate butyl (meth)acrylate, a 2-butanone oxime adduct of 2-isocyanate ethyl (meth)acrylate, a pyrazole adduct of 2-isocyanate ethyl (meth)acrylate, a 3,5-dimethylpyrazole adduct of 2-isocyanate ethyl (meth)acrylate, a 3-methylpyrazole adduct of 2-isocyanate ethyl (meth)acrylate, an ε-caprolactam adduct of 2-isocyanate ethyl (meth)acrylate, a 2-butanone oxime adduct of 3-isocyanate propyl (meth)acrylate and a pyrazole adduct of 3-isocyanate propyl (meth)acrylate;

a 3,5-dimethylpyrazole adduct of 3-isocyanate propyl (meth)acrylate, a 3-methylpyrazole adduct of 3-isocyanate propyl (meth)acrylate, an ε-caprolactam adduct of 3-isocyanate propyl (meth)acrylate, a 2-butanone oxime adduct of 4-isocyanate butyl (meth)acrylate, a pyrazole adduct of 4-isocynate butyl (meth)acrylate, a 3,5-dimethylpyrazole adduct of 4-isocyanate butyl (meth)acrylate, a 3-methylpyrazole adduct of 4-isocyanate butyl (meth)acrylate and an ε-caprolactam adduct of 4-isocyanate butyl (meth)acrylate;

methoxymethyl (meth)acrylamide, ethoxymethyl (meth)acrylamide, butoxymethyl (meth)acrylamide, diacetone acrylamide, γ-methacryloyloxypropyltrimethoxysilane, trimethoxy vinyl silane, vinyl trimethoxysilane, dimethylaminoethyl (meth)acrylate, diethylaminoethyl (meth)acrylate, dimethylaminopropyl (meth)acrylate, (meth)acryloylmorpholine, (meth)acryloyloxyethyltriethylammonium chloride, (meth)acryloyloxypropyltrimethylammonium chloride, (meth)acrylamide ethyltrimethylammonium chloride and (meth)acrylamidepropyltrimethylammonium chloride;

t-butyl (meth)acrylamide sulfonic acid, (meth)acrylamide, N-methyl (meth)acrylamide, N-methylol (meth)acrylamide, N-butoxymethyl (meth)acrylamide, diacetone (meth)acrylamide, glycidyl (meth)acrylate, 2-hydroxyethyl (meth)acrylate, 2-hydroxypropyl (meth)acrylate, 4-hydroxybutyl (meth)acrylate, 3-chloro-2-hydroxypropyl methacrylate, polyoxyalkylene glycol mono(meth)acrylate, (meth)acrylic acid, 2-(meth)acryloyloxyethyl succinic acid, 2-(meth)acryloyloxyhexahydrophthalic acid, 2-(meth)acryloyloxyethyl acid phosphate, allyl (meth)acrylate, 2-vinyl-2-oxazoline and a polycaprolactone ester of 2-vinyl-4-ethyl-(2-vinyl oxazoline)hydroxyethyl (meth)acrylate;

tri(meth)allyl isocyanurate (T(M)AIC, manufactured by Nippon Kasei Chemical Co., Ltd.), triallyl cyanurate (TAC, manufactured by Nippon Kasei Chemical Co., Ltd.), phenyl glycidyl ethyl acrylate tolylene diisocyanate (AT-600, manufactured by KYOEISHA CHEMICAL CO., LTD.), and 3-(methylethylketoxime) isocyanate methyl-3,5,5-trimethylcyclohexyl (2-hydroxyethyl methacrylate) cyanate (TECH-COAT HE-6P, manufactured by KYOKEN KASEI). A polycaprolactone ester of hydroxyethyl (meth)acrylate (PLACCEL FA, FM series, manufactured by DAICEL CHEMICAL INDUSTRIES, LTD.).

The monomer (d) is preferably N-methylol (meth)acrylamide, 2-hydroxyethyl (meth)acrylate, glycidyl (meth)acrylate, 3-chloro-2-hydroxypropyl methacrylate or a polycaprolactone ester (PLACCEL FA, FM series, manufactured by DAICEL CHEMICAL INDUSTRIES, LTD.) of hydroxymethyl (meth)acrylate.

(Monomer (e))

Monomer (e) is a monomer other than monomer (a), monomer (b), monomer (c) and monomer (d).

As the monomer (e), the following compounds may be mentioned:

methyl (meth)acrylate, ethyl (meth)acrylate, propyl (meth)acrylate, butyl (meth)acrylate, cyclohexyl (meth)acrylate, 2-ethylhexyl (meth)acrylate, n-hexyl (meth)acrylate, benzyl (meth)acrylate, octyl (meth)acrylate, decyl methacrylate, cyclododecyl acrylate, 3-ethoxypropyl acrylate, methoxy-butyl acrylate, 2-ethylbutyl acrylate, 1,3-dimethylbutyl acrylate, 2-methylpentyl acrylate and stearyl (meth)acrylate;

vinyl acetate, vinyl propionate, butene, isoprene, butadiene, ethylene, propylene, vinyl ethylene, pentene, ethyl-2-propylene, butylethylene, cyclohexylpropylethylene, decylethylene, dodecylethylene, hexene, isohexylethylene, neopentylethylene, (1,2-diethoxycarbonyl)ethylene, (1,2-dipropoxycarbonyl)ethylene, methoxyethylene, ethoxyethylene, butoxyethylene, 2-methoxypropylene, pentyloxyethylene, cyclopentanoyloxyethylene, cyclopentylacetoxyethylene, styrene, α-methylstyrene, p-ethylstyrene, hexylstyrene, octylstyrene and nonylstyrene;

N,N-dimethyl (meth)acrylamide, a vinyl alkyl ether, a halogenated alkyl vinyl ether, a vinyl alkyl ketone, aziridinyl ethyl (meth)acrylate, 2-ethylhexylpolyoxyalkylene (meth) acrylate and polyoxyalkylene di(meth)acrylate;

An alkyl chrotonate, an alkyl maleate, an alkyl fumarate, an alkyl citraconate, an alkyl mesaconate, triallyl cyanurate, allyl acetate, N-vinyl carbazole, maleimide, N-methylmaleimide, a (meth)acrylate having a silicone in its side chain, a (meth)acrylate having an urethane bond, a (meth)acrylate having a polyoxyalkylene chain with a terminal $C_{1-4}$ alkyl group, an alkylene di(meth)acrylate, etc.

The content of structural units based on the monomer (a) is from 5 to 95 mass %, preferably from 15 to 95 mass %, particularly preferably from 25 to 95 mass %, in the total monomers (100 mass %) from the viewpoint of dynamic water repellency, after air-drying water repellency and friction durability.

The content of structural units based on the monomer (b) is from 5 to 60 mass %, preferably from 5 to 55 mass %, particularly preferably from 5 to 50 mass %, in the total monomers (100 mass %) from the viewpoint of dynamic water repellency, after air-drying water repellency and friction durability.

Further, the sum of the contents of structural units based on the monomer (a) and structural units based on the monomer (b) is at least 65 mass %, preferably at least 70 mass %, particularly preferably at least 75 mass %, in the total structural units (100 mass %). By adjusting the sum of the contents to be at least 65 mass %, it is possible to provide both dynamic water repellency and after air-drying water repellency.

The content of structural units based on the monomer (c) may be 0 mass %, preferably more than 0 mass %, more preferably from 1 to 35 mass %, further preferably from 1 to 30 mass %, particularly preferably from 1 to 25 mass %, in the total monomers (100 mass %) from the viewpoint of increasing hydrophobicity of the copolymer and showing better durable water repellency.

The content of structural units based on the monomer (d) is preferably from 0 to 10 mass % in the total monomers (100 mass %), and from the viewpoint of friction durability, it is more preferably from 0.1 to 8 mass %, particularly preferably from 0.1 to 5 mass %.

The content of structural units based on the monomer (e) is preferably from 0 to 20 mass %, more preferably from 0 to 15 mass %, in the total monomers (100 mass %).

The contents of structural units based on monomers in the present invention are obtained by NMR analysis and elemental analysis. Further, in a case where the contents are not available from NMR analysis and elemental analysis, the contents may be calculated based on the amounts of monomers charged at the time of production of copolymers.

(Method for Producing the Copolymer)

The copolymer of the present invention is produced by the following method.

A method which comprises polymerizing a monomer mixture containing a monomer (a) and a monomer (b), and, as the case requires, monomers (c) to (e), in a medium in the presence of a surfactant and a polymerization initiator, to obtain a solution, dispersion or emulsion of a copolymer.

The polymerization method may, for example, be a dispersion polymerization method, an emulsion polymerization method or a suspension polymerization method, and it is preferably emulsion polymerization. Further, the polymerization method may be bulk polymerization or multistage polymerization.

As the method for producing a copolymer of the present invention, preferred is a method of obtaining an emulsion of a copolymer by emulsion polymerization of a monomer mixture containing a monomer (a) and a monomer (b), and, as the case requires, monomers (c) to (e), in the presence of a surfactant and a polymerization initiator.

From the viewpoint of improvement in yield of the copolymer, it is preferred to pre-emulsify a mixture comprising monomers, a surfactant and an aqueous medium before emulsion polymerization. For example, a mixture comprising monomers, a surfactant and an aqueous medium is mixed and dispersed by a homomixer or a high-pressure emulsification equipment.

The medium may be the after-mentioned medium.

The surfactant may be the after-mentioned surfactant.

The amount of the surfactant is preferably from 1 to 10 parts by mass per 100 parts by mass of the monomer mixer.

The polymerization initiator may, for example, be a thermal polymerization initiator, a photo-polymerization initiator, a radiation polymerization initiator, a radical polymerization initiator or an ionic polymerization initiator, and it is preferably a water-soluble or oil-soluble radical polymerization initiator.

As the radical polymerization initiator, a common polymerization initiator such as an azo polymerization initiator, a peroxide polymerization initiator or a redox polymerization initiator is used depending on the polymerization temperature. The radical polymerization initiator is particularly preferably an azo compound, and when the polymerization is carried out in an aqueous medium, it is further preferably a salt of an azo compound. The polymerization temperature is preferably between 20° C. and 150° C.

The amount of the polymerization initiator is preferably from 0.1 to 5 parts by mass, more preferably from 0.1 to 3 parts by mass, per 100 parts by mass of the monomer mixture.

At the time of the polymerization of the monomer mixture, a molecular weight modifier may be used. The molecular weight modifier is preferably an aromatic compound, a mercapto alcohol or a mercaptan, particularly preferably an alkyl mercaptan. The molecular weight modifier may, for example, be mercapto ethanol, n-octyl mercaptan, n-dodecyl mercaptan, t-dodecyl mercaptan, stearyl mercaptan or α-methylstyrene dimer ($CH_2$=$C(Ph)CH_2C(CH_3)_2Ph$, wherein Ph is a phenyl group).

The amount of the molecular weight modifier is preferably from 0.01 to 5 parts by mass, more preferably from 0.1 to 3 parts by mass, per 100 parts by mass of the monomer mixture.

Further, the monomer mixture may be polymerized in the presence of a multi-functional mercapto compound such as diethylene glycol bis(3-mercapto butyrate), pentaerythritol tetrakis(3-mercapto butyrate), 2,4,6-trimercapto triazine or 1,3,5-tris(3-mercapto butyloxyethyl)-1,3,5-triazine-2,4,6 (1H,3H,5H)-trione.

The content of the monomer (a) is from 5 to 95 mass %, preferably from 15 to 95 mass %, particularly preferably from 25 to 95 mass %, in the monomer mixture (100 mass %) from the viewpoint of dynamic water repellency, after air-drying water repellency and friction durability.

The content of the monomer (b) is from 5 to 60 mass %, preferably from 5 to 55 mass %, particularly preferably from 5 to 50 mass %, in the monomer mixture (100 mass %) from the viewpoint of dynamic water repellency, after air-drying water repellency and friction durability.

Further, the sum of the contents of the monomer (a) and the monomer (b) is at least 65 mass %, preferably at least 70 mass %, particularly preferably at least 75 mass %, in the monomer mixture (100 mass %). By adjusting the sum of the contents to be at least 65 mass %, it is possible to provide both dynamic water repellency and after air-drying water repellency.

The content of the monomer (c) may be 0 mass %, but is preferably more than 0 mass %, more preferably from 1 to 35 mass %, further preferably from 1 to 30 mass %, particularly preferably from 1 to 25 mass %, in the monomer mixture (100 mass %) with a view to improving hydrophobicity of the copolymer to provide better durable water repellency.

The content of the monomer (d) is preferably from 0 to 10 mass %, more preferably from 0.1 to 8 mass %, particularly preferably from 0.1 to 5 mass %, in the monomer mixture (100 mass %) from the viewpoint of friction durability.

The content of the monomer (e) is preferably from 0 to 20 mass %, more preferably from 0 to 15 mass %, in the monomer mixture (100 mass %).

The weight average molecular weight (Mw) of the copolymer of the present invention is preferably from 1,000 to 1,000,000, particularly preferably from 3,000 to 1,000,000.

The weight average molecular weight (Mw) of the copolymer is a molecular weight as calculated as polystyrene, which is measured by gel permeation chromatography (GPC).

In the above-described copolymer of the present invention, by the presence of structural units based on the monomer (b), the orientation of a long-chain alkyl group in structural units based on the monomer (a) will be improved, whereby dynamic water repellency and after air-drying water repellency will be improved. Further, by the presence of structural units based on the monomer (b), the adhesive property of the copolymer of the present invention to an article and the strength of the coating film made of the copolymer of the present invention will be improved, whereby the friction durability will be improved.

Further, since the copolymer of the present invention has no structural units based on the monomer (c) or even when it has structural units based on the monomer (c), the content is at a level of from 1 to 35 mass %, its impact on the environment is low as compared to a conventional one.

<Water Repellent Composition>

The water repellent composition of the present invention comprises the copolymer of the present invention and a medium as essential components, and may contain a surfactant or an additive as the case requires.

(Medium)

The medium may, for example, be water, an alcohol, a glycol, a glycol ether, a halogen compound, a hydrocarbon, a ketone, an ester, an ether, a nitrogenous compound, a sulfur compound, an inorganic solvent or an organic acid. Among them, at least one medium selected from the group consisting of water, an alcohol, a glycol, a glycol ether and a glycol ester is preferred from the viewpoint of solubility and easiness in handling.

The alcohol may, for example, be methanol, ethanol, 1-propanol, 2-propanol, 1-butanol, 2-butanol, 2-methylpropanol, 1,1-dimethylethanol, 1-pentanol, 2-pentanol, 3-pentanol, 2-methyl-1-butanol, 3-methyl-1-butanol, 1,1-dimethylpropanol, 3-methyl-2-butanol, 1,2-dimethylpropanol, 1-hexanol, 2-methyl-1-pentanol, 4-methyl-2-pentanol, 2-ethyl-1-butanol, 1-heptanol, 2-heptanol or 3-heptanol.

The glycol or the glycol ether may, for example, be ethylene glycol, ethylene glycol monomethyl ether, ethylene glycol monoethyl ether, ethylene glycol monobutyl ether, ethylene glycol monomethyl ether acetate, ethylene glycol monoethyl ether acetate, ethylene glycol monobutyl ether acetate, propylene glycol, propylene glycol monomethyl ether, propylene glycol monoethyl ether, propylene glycol dimethyl ether, dipropylene glycol, dipropylene glycol monomethyl ether, dipropylene glycol dimethyl ether, dipropylene glycol monoethyl ether, tripropylene glycol, tripropylene glycol monomethyl ether, polypropylene glycol or hexylene glycol.

The halogen compound may, for example, be a halogenated hydrocarbon or a halogenated ether.

The halogenated hydrocarbon may, for example, be a hydrochlorofluorocarbon, a hydrofluorocarbon or a hydrobromocarbon.

The halogenated ether may, for example, be a hydrofluoro ether.

The hydrofluoro ether may, for example, be a separated-type hydrofluoro ether or a non-separated-type hydrofluoro ether. The separated-type hydrofluoro ether is a compound wherein a $R^F$ or perfluoroalkylene group, and an alkyl or alkylene group, are connected via an etheric oxygen atom. The non-separated-type hydrofluoro ether is a hydrofluoro ether having a partially fluorinated alkyl or alkylene group.

The hydrocarbon may, for example, be an aliphatic hydrocarbon, an alicyclic hydrocarbon or an aromatic hydrocarbon.

The aliphatic hydrocarbon may, for example, be pentane, 2-methylbutane, 3-methylpentane, hexane, 2,2-dimethylbutane, 2,3-dimethylbutane, heptane, octane, 2,2,4-trimethylpentane, 2,2,3-trimethylhexane, decane, undecane, dodecane, 2,2,4,6,6-pentamethylheptane, tridecane, tetradecane or hexadecane.

The alicyclic hydrocarbon may, for example, be cyclopentane, methylcyclopentane, cyclohexane, methylcyclohexane or ethylcyclohexane.

The aromatic hydrocarbon may, for example, be benzene, toluene or xylene.

The ketone may, for example, be acetone, methyl ethyl ketone, 2-pentanone, 3-pentanone, 2-hexanone or methyl isobutyl ketone.

The ester may, for example, be methyl acetate, ethyl acetate, butyl acetate, methyl propionate, methyl lactate, ethyl lactate or pentyl lactate.

The ether may, for example, be diisopropyl ether, dioxane or tetrahydrofuran.

The nitrogenous compound may, for example, be pyridine, N,N-dimethylformamide, N,N-dimethylacetamide or N-methylpyrrolidone.

The sulfur compound may, for example, be dimethyl sulfoxide or sulforane.

The inorganic solvent may, for example, be liquid carbon dioxide.

The organic acid may, for example, be acetic acid, propionic acid, maleic acid or lactic acid.

Such media may be used alone or in combination as a mixture of two or more of them. When two or more such media are used in combination as a mixture, one of them is preferably water. By using a mixture of such media, control of solubility or dispersability of the copolymer becomes easy, and control of permeability or wettability to an article, or solvent drying speed at the time of manufacture becomes easy.

(Surfactant)

The surfactant may be a hydrocarbon surfactant or a fluorinated surfactant, and each of them may be an anionic surfactant, a nonionic surfactant, a cationic surfactant or an amphoteric surfactant.

The surfactant is preferably a combination of a nonionic surfactant and a cationic surfactant or amphoteric surfactant, or an anionic surfactant alone from the viewpoint of dispersion stability, and a combination of a nonionic surfactant and a cationic surfactant is preferred.

The ratio of a nonionic surfactant to a cationic surfactant (a nonionic surfactant/a cationic surfactant) is preferably from 97/3 to 40/60 (mass ratio).

In a specific combination of a nonionic surfactant and a cationic surfactant, their total amount to the copolymer (100 mass %) can be adjusted to be at most 5 mass %, whereby adverse effect on the water repellency of an article can be reduced.

The nonionic surfactant is preferably at least one member selected from the group consisting of surfactants $s^1$ to $s^6$.

Surfactant $s^1$:

The surfactant $s^1$ is a polyoxyalkylene monoalkyl ether, a polyoxyalkylene monoalkenyl ether, a polyoxyalkylene monoalkapolyenyl ether or a polyoxyalkylene monopolyfluoroalkyl ether.

The surfactant $s^1$ is preferably a polyoxyalkylene monoalkyl ether, a polyoxyalkylene monoalkenyl ether or a polyoxyalkylene monopolyfluoroalkyl ether. As surfactant $s^1$, one of such surfactants may be used alone or two or more of them may be used in combination.

An alkyl group, an alkenyl group, an alkapolyenyl group or a polyfluoroalkyl group (hereinafter collectively referred to as a $R^s$ group) preferably has from 4 to 26 carbon atoms. The $R^s$ group may be linear or branched. The branched $R^s$ group is preferably a secondary alkyl group, a secondary alkenyl group or a secondary alkapolyenyl group. Some or all of the hydrogen atoms in the $R^s$ group may be substituted by fluorine atoms.

Specific examples of the $R^s$ group include an octyl group, a dodecyl group, a tetradecyl group, a hexadecyl group, a stearyl group (octadecyl group), a behenyl group (docosyl group), an oleyl group (9-octadecenyl group), a heptadecylfluorooctyl group, a tridecylfluorohexyl group, a 1H,1H,2H,2H-tridecylfluorooctyl group and a 1H,1H,2H,2H-nonafluorohexyl group.

A polyoxyalkylene (hereinafter referred to as POA) chain is preferably a catenated chain consisting of two or more polyoxyethylene (hereinafter referred to as POE) chains and/or polyoxypropylene (hereinafter referred to as POP) chains. The POA chain may consist of one type of POA chains or two or more types of POA chains. When the POA chain consists of two or more types of POA chains, such POA chains are preferably linked to form blocks.

Surfactant $s^1$ is more preferably compound ($s^{11}$):

$$R^{10}O[CH_2CH(CH_3)O]_s\text{—}(CH_2CH_2O)_rH \quad (s^{11})$$

wherein $R^{10}$ is an alkyl group having at least 8 carbon atoms or an alkenyl group having at least 8 carbon atoms, r is an integer of from 5 to 50, and s is an integer of from 0 to 20. Some of hydrogen atoms in the $R^{10}$ may be substituted by fluorine atoms.

When r is at least 5, the surfactant is soluble in water and can be uniformly dissolved in an aqueous medium, and thus the water repellent composition will have good permeability to an article. When r is at most 50, its hydrophobicity is suppressed and water repellency will be good.

When s is at most 20, the surfactant is soluble in water and can be uniformly dissolved in an aqueous medium, and thus the water repellent composition will have good permeability to an article.

When r and s are at least 2, the POA chains and the POP chains are linked to form blocks.

$R^{10}$ has preferably a linear or branched structure.

r is preferably an integer of from 10 to 30.

s preferably an integer of from 0 to 10.

The following compounds may be mentioned as examples of compound ($s^{11}$), wherein the POE chains and the POP chains are linked to form blocks.

$C_{18}H_{37}O[CH_2CH(CH_3)O]_2\text{—}(CH_2CH_2O)_{30}H$,
$C_{18}H_{35}O\text{—}(CH_2CH_2O)_{30}H$,
$C_{16}H_{33}O[CH_2CH(CH_3)O]_5\text{—}(CH_2CH_2O)_{20}H$,
$C_{12}H_{25}O[CH_2CH(CH_3)O]_2\text{—}(CH_2CH_2O)_{15}H$,
$(C_8H_{17})(C_6H_{13})CHO\text{—}(CH_2CH_2O)_{15}H$,
$C_{10}H_{21}O[CH_2CH(CH_3)O]_2\text{—}(CH_2CH_2O)_{15}H$,
$C_6F_{13}CH_2CH_2O\text{—}(CH_2CH_2O)_{15}H$,
$C_6F_{13}CH_2CH_2O[CH_2CH(CH_3)O]_2\text{—}(CH_2CH_2O)_{15}H$,
$C_4F_9CH_2CH_2O[CH_2CH(CH_3)O]_2\text{—}(CH_2CH_2O)_{15}H$.

Surfactant $s^2$:

Surfactant $s^2$ is a nonionic surfactant made of a compound having at least one carbon-carbon triple bond and at least one hydroxy group in the molecule.

Surfactant $s^2$ is preferably a nonionic surfactant made of a compound having one carbon-carbon triple bond and one or two hydroxy group(s) in the molecule.

Surfactant $s^2$ may have a POA chain in the molecule. The POA chain may, for example, be a POE chain, a POP chain, a chain wherein POE chains and POP chains are linked in a random manner or a chain wherein POE chains and POP chains are linked to form blocks.

Surfactant $s^2$ is preferably compounds ($s^{21}$) to ($s^{24}$):

$$HO\text{—}C(R^{11})(R^{12})\text{—}C\equiv C\text{—}C(R^{13})(R^{14})\text{—}OH \quad (s^{21}),$$

$$HO\text{-}(A^1O)_u\text{—}C(R^{11})(R^{12})\text{—}C\equiv C\text{—}C(R^{13})(R^{14})\text{—}(OA^2)_v\text{-}OH \quad (s^{22}),$$

$$HO\text{—}C(R^{15})(R^{16})\text{—}C\equiv C\text{—}H \quad (s^{23}),$$

$$HO\text{-}(A^3O)_w\text{—}C(R^{15})(R^{16})\text{—}C\equiv C\text{—}H \quad (s^{24}).$$

Each of $A^1$ to $A^3$ is an alkylene group.

Each of u and v is an integer of at least 0, and (u+v) is an integer of at least 1.

w is an integer of at least 1.

When each of u, v and w is at least 2, the plurality of $A^1$ to $A^3$ may be the same or different, respectively.

The POA chain is preferably a POE chain, a POP chain or a chain containing a POE chain and a POP chain. The number or repeating units of the POA chain is preferably from 1 to 50.

Each of $R^{11}$ to $R^{16}$ independently is a hydrogen atom or an alkyl group.

The alkyl group is preferably a $C_{1-12}$ alkyl group, more preferably a $C_{1-4}$ alkyl group. The alkyl group may, for example, be a methyl group, an ethyl group, a propyl group, a butyl group or an isobutyl group.

Compound ($s^{22}$) is preferably compound ($s^{25}$):

$$\underset{\underset{CH_3}{|}}{HO(CH_2CH_2O)_xC}\overset{\overset{(CH_3)_2CHCH_2}{|}}{\text{—}}C\equiv C\text{—}\underset{\underset{CH_2CH(CH_3)_2}{|}}{\overset{\overset{CH_3}{|}}{C}}(OCH_2CH_2)_yOH \quad (s^{25})$$

wherein each of x and y independently is an integer of from 0 to 100.

One of compound ($s^{25}$) may be used alone or two or more of them may be used in combination.

Compound ($s^{25}$) is preferably a compound wherein both x and y are 0, a compound wherein the average of sum of x and y is from 1 to 4, or a compound wherein the average of sum of x and y is from 10 to 30.

Surfactant $s^3$:

Surfactant $s^3$ is a nonionic surfactant made of a compound wherein a POE chain and a POA chain consisting of two or more consecutively-connected oxyalkylene having at least 3 carbon atoms are catenated and both terminals are hydroxy groups.

Such a POA chain is preferably a polyoxytetramethylene (hereinafter referred to as POT) and/or a POP chain.

Surfactant $s^3$ is preferably compound ($s^{31}$) or compound ($s^{32}$):

$$HO(CH_2CH_2O)_{g1}(C_3H_6O)_t(CH_2CH_2O)_{g2}H \qquad (s^{31}),$$

$$HO(CH_2CH_2O)_{g1}(CH_2CH_2CH_2CH_2O)_t(CH_2CH_2O)_{g2}H \qquad (s^{32}).$$

g1 is an integer of from 0 to 200.
t is an integer of from 2 to 100.
g2 is an integer of from 0 to 200.
When g1 is 0, g2 is an integer of at least 2. When g2 is 0, g1 is an integer of at least 2.

—$C_3H_6$— may be —$CH(CH_3)CH_2$—, —$CH_2CH(CH_3)$—, or a mixture of —$CH(CH_3)CH_2$— and —$CH_2CH(CH_3)$—.

The POA chains are in block form.

The following compounds may be mentioned as surfactant $s^3$:

HO—$(CH_2CH_2O)_{15}$—$(C_3H_6O)_{35}$—$(CH_2CH_2O)_{15}$H,
HO—$(CH_2CH_2O)_5$—$(C_3H_6O)_{35}$—$(CH_2CH_2O)_8$H,
HO—$(CH_2CH_2O)_{45}$—$(C_3H_6O)_{17}$—$(CH_2CH_2O)_{45}$H,
HO—$(CH_2CH_2O)_{34}$—$(CH_2CH_2CH_2CH_2O)_{28}$—$(CH_2CH_2O)_{34}$H.

Surfactant $s^4$:

Surfactant $s^4$ is a nonionic surfactant having an amine-oxide portion in the molecule.

Surfactant $s^4$ is preferably compound ($s^{41}$):

$$(R^{17})(R^{18})(R^{19})N(\rightarrow O) \qquad (s^{41})$$

wherein each of $R^{17}$ to $R^{19}$ independently is a monovalent hydrocarbon group.

In the present invention, a surfactant having an amine oxide (N→O) is regarded as the nonionic surfactant.

One of compound ($s^{41}$) may be used alone or two or more of them may be used in combination.

Compound ($s^{41}$) is preferably compound ($s^{42}$) from the viewpoint of dispersion stability of the copolymer;

$$(R^{20})(CH_3)_2N(\rightarrow O) \qquad (s^{42})$$

wherein $R^{20}$ is a $C_{6-22}$ alkyl group, a $C_{6-22}$ alkenyl group, a phenyl group to which a $C_{6-22}$ alkyl group is bonded, a phenyl group to which a $C_{6-22}$ alkenyl group is bonded, or a $C_{6-13}$ fluoroalkyl group. $R^{20}$ is preferably a $C_{8-22}$ alkyl group, a $C_{8-22}$ alkenyl group or a $C_{4-9}$ polyfluoroalkyl group.

The following compounds may be mentioned as compound ($s^{42}$):

[H(CH$_2$)$_{12}$](CH$_3$)$_2$N(→O),
[H(CH$_2$)$_{14}$](CH$_3$)$_2$N(→O),
[H(CH$_2$)$_{16}$](CH$_3$)$_2$N(→O),
[H(CH$_2$)$_{18}$](CH$_3$)$_2$N(→O),
[F(CF$_2$)$_6$(CH$_2$)$_2$](CH$_3$)$_2$N((→O),
[F(CF$_2$)$_4$(CH$_2$)$_2$](CH$_3$)$_2$N(→O).

Surfactant $s^5$:

Surfactant $s^5$ is a nonionic surfactant made of a polyoxyethylene mono(substituted phenyl)ether condensate or a polyoxyethylene mono(substituted phenyl)ether.

The substituted phenyl group is preferably a phenyl group substituted by a monovalent hydrocarbon group, more preferably a phenyl group substituted by an alkyl group, an alkenyl group or a styryl group.

Surfactant $s^5$ is preferably a polyoxyethylene mono(alkylphenyl)ether condensate, a polyoxyethylene mono(alkenylphenyl)ether condensate, a polyoxyethylene mono(alkylphenyl)ether, a polyoxyethylene mono(alkenylphenyl)ether or a polyoxyethylene mono[(alkyl)(styryl)phenyl]ether.

The polyoxyethylene mono(substituted phenyl)ether condensate or polyoxyethylene mono(substituted phenyl)ether may, for example, be a formaldehyde condensate of polyoxyethylene mono(nonylphenyl)ether, polyoxyethylene mono(nonylphenyl)ether, polyoxyethylene mono(octylphenyl)ether, polyoxyethylene mono(oleylphenyl)ether, polyoxyethylene mono[(nonyl)(styryl)phenyl]ether or polyoxyethylene mono[(oleyl)(styryl)phenyl]ether.

Surfactant $s^6$:

Surfactant $s^6$ is a nonionic surfactant made of a fatty acid ester of a polyol.

The polyol is glycerol, sorbitan, sorbit, polyglycerol, polyethylene glycol, polyoxyethylene glyceryl ether, polyoxyethylene sorbitan ether or polyoxyethylene sorbit ether.

Surfactant $s^6$ may, for example, be an ester derived from stearic acid and polyethylene glycol in 1:1 molar ratio, an ester derived from an ether of sorbit and polyethylene glycol, and oleic acid in 1:4 molar ratio, an ester derived from an ether of polyoxyethylene glycol and sorbitan, and stearic acid in 1:1 molar ratio, an ester derived from an ether of polyethylene glycol and sorbitan, and oleic acid in 1:1 molar ratio, an ester derived from dodecanoic acid and sorbitan in 1:1 molar ratio, an ester derived from oleic acid and decaglycerol in 1:1 or 2:1 molar ratio, or an ester derived from stearic acid and decaglycerol in 1:1 or 2:1 molar ratio.

Surfactant $s^7$:

When the surfactant contains a cationic surfactant, such a cationic surfactant is preferably surfactant $s^7$.

Surfactant $s^7$ is a cationic surfactant having a substituted ammonium salt form.

Surfactant $s^7$ is preferably an ammonium salt wherein at least one hydrogen atom bonded to the nitrogen atom is substituted by an alkyl group, an alkenyl group or a POA chain having a hydroxy group at the terminal, more preferably compound ($s^{71}$);

$$[(R^{21})_4N^+].X^- \qquad (s^{71})$$

wherein $R^{21}$ is a hydrogen atom, a $C_{1-22}$ alkyl group, a $C_{2-22}$ alkenyl group, a $C_{1-9}$ fluoroalkyl group or a POA chain having a hydroxy group at the terminal. The four $R^{21}$ may be the same or different, however, all of the four $R^{21}$ are not hydrogen atoms at the same time.

$R^{21}$ is preferably a $C_{6-22}$ long-chain alkyl group, a $C_{6-22}$ long-chain alkenyl group or a $C_{1-9}$ fluoroalkyl group.

When $R^{21}$ is an alkyl group other than a long-chain alkyl group, the $R^{21}$ is preferably a methyl group or an ethyl group.

When $R^{21}$ is a POA chain having a hydroxy group at the terminal, the POA chain is preferably a POE chain.

$X^-$ is a counter ion.

$X^-$ is preferably a chloride ion, an ethyl sulfate ion or an acetate ion.

Compound ($s^{71}$) may, for example, be monostearyltrimethylammonium chloride, monostearyldimethylmonoethylammonium ethyl sulfate, mono(stearyl)monomethyl di(polyethylene glycol)ammonium chloride, monofluorohexyltrimethylammonium chloride, di(tallow alkyl)dimethylammonium chloride or dimethyl mono coconuts amine acetate.

Surfactant $s^8$

When the surfactant contains an amphoteric surfactant, such an amphoteric surfactant is preferably surfactant $s^8$.

Surfactant $s^8$ is alanines, imidazolinium betaines, amide betaines or betaine acetate.

The hydrophobic group is preferably a $C_{6-22}$ long-chain alkyl group, a $C_{6-22}$ long-chain alkenyl group or a $C_{1-9}$ fluoroalkyl group.

Surfactant $s^8$ may, for example, be dodecyl betaine, stearyl betaine, dodecylcarboxymethylhydroxyethyl imidazolinium betaine, dodecyldimethylaminoacetate betaine or fatty acid amidopropyl dimethylaminoacetate betaine.

Surfactant $s^9$:

Surfactant $s^9$ may be used as the surfactant.

Surfactant $s^9$ is a polymeric surfactant made of a block copolymer, a random copolymer or a hydrophobically modified body of a hydrophilic copolymer, which is derived from a hydrophilic monomer and a hydrophobic hydrocarbon monomer and/or a hydrophobic fluoromonomer.

Surfactant $s^9$ may, for example, be a block or random copolymer derived from polyethylene glycol (meth)acrylate and a long-chain alkyl acrylate, a block or random copolymer derived from polyethylene glycol (meth)acrylate and fluoro (meth)acrylate, a block or random copolymer derived from vinyl acetate and a long-chain alkyl vinyl ether, a block or random copolymer derived from vinyl acetate and a long-chain alkyl vinyl ester, a polymer derived from styrene and maleic anhydride, a condensate of polyvinyl alcohol and stearic acid, a condensate of polyvinyl alcohol and stearyl mercaptan, a condensate of polyallylamine and stearic acid, a condensate of polyethyleneimine and stearyl alcohol, methylcellulose, hydroxypropylmethylcellulose or hydroxyethylmethylcellulose.

Examples of a commercial product of surfactant $s^9$ include MP Polymer (item code: MP-103, MP-203) manufactured by Kuraray Co., Ltd., SMA Resins manufactured by Elf Atochem Inc., METOLOSE manufactured by Shin-Etsu Chemical Co., Ltd., EPOMIN RP manufactured by NIPPON SHOKUBAI Co., Ltd. and Surflon (item code: S-381, S-393) manufactured by AGC Seimi Chemical Co., Ltd.

Surfactant $s^9$ is preferably surfactant $s^{91}$ when the medium is an organic solvent or has a high content of an organic solvent.

Surfactant $s^{91}$: a polymeric surfactant made of a block or random copolymer (its polyfluoroalkyl denatured body) derived from a lipophilic monomer and a fluoromonomer.

Surfactant $s^{91}$ may, for example, be a copolymer derived from an alkyl acrylate and fluoro (meth)acrylate or a copolymer derived from an alkyl vinyl ether and a fluoroalkyl vinyl ether.

Examples of a commercial product of surfactant $s^{91}$ include Surflon (item code: S-383, SC-100 series) manufactured by AGC Seimi Chemical Co., Ltd.

The combination of the surfactants is preferably a combination of surfactant $s^1$, surfactant $s^2$ and surfactant $s^7$; a combination of surfactant $s^1$, surfactant $s^3$ and surfactant $s^7$; or a combination of surfactant $s^1$, surfactant $s^2$, surfactant $s^3$ and surfactant $s^7$, more preferably such combinations wherein surfactant $s^7$ is compound ($s^{71}$), from the viewpoint of excellence in water repellency, durability of the water repellent composition and stability of the obtained emulsion.

The total amount of the surfactants is preferably from 1 to 10 parts by mass, more preferably from 1 to 7 parts by mass to the copolymer (100 parts by mass).

(Additives)

The water repellent composition of the present invention may contain various additives as the case requires.

The additives may, for example, be a penetrant, an antifoaming agent, a water absorbent, an anti-stat, an anti-static polymer, an anti-crease agent, a softener, a film-forming aid, a water-soluble polymer (polyacrylamide, polyvinyl alcohol, etc.), a thermosetting agent (melamine resin, urethane resin, a triazine ring-containing compound, an isocyanate type compound, etc.), an epoxy curing agent (isophthalic acid dihydrazide, adipic acid dihydrazide, sebacic acid dihydrazide, dodecanedioic acid dihydrazide, 1,6-hexamethylene bis(N, N-dimethylsemicarbazide), 1,1,1',1',-tetramethyl-4,4'-(methylene-di-p-phenylene)disemicarbazide, spiroglycol, etc.)), a thermosetting catalyst, a cross-linking catalyst, a synthetic resin, a fiber stabilizer and inorganic particles.

Further, the water repellent composition of the present invention may contain a copolymer having water and/or oil repellency other than the copolymer of the present invention (e.g. a copolymer having the high content of structural units based on the monomer (c), a commercial water repellent, a commercial oil repellent or a commercial water/oil repellent), a water repellent compound having no fluorine atom, etc., as the case requires. Such a water repellent compound having no fluorine atom may, for example, be a paraffin type compound, an aliphatic amide type compound, an alkylethylene urea type compound or a silicon type compound.

(Preparation of Water Repellent Composition)

The water repellent composition of the present invention may be prepared by the following method (i) or (ii).

(i) A method which comprises polymerizing a monomer mixture comprising a monomer (a) and a monomer (b), and as the case requires monomers (c) to (e), in a medium in the presence of a surfactant and a polymerization initiator, to obtain a solution, dispersion or emulsion of a copolymer, and adding another medium, another surfactant and additives as the case requires.

(ii) A method which comprises polymerizing a monomer mixture comprising a monomer (a) and a monomer (b), and as the case requires monomers (c) to (e), in a medium in the presence of a surfactant and a polymerization initiator, to obtain a solution, dispersion or emulsion of a copolymer, separating the copolymer, and adding a medium and a surfactant, and additives as the case requires, to the copolymer.

The polymerization of the monomer mixture may be conducted in the same manner as the polymerization in the above-described method for producing the copolymer.

In the water repellent composition of the present invention, it is preferred that the copolymer is dispersed in the form of particles in the medium. The average particle size of the copolymer is preferably from 10 to 1,000 nm, more preferably from 10 to 300 nm, particularly preferably from 10 to 250 nm. When the average particle size is within such a range, a surfactant, a dispersant, etc. are not required in large amounts, water repellency is good, dyed fabrics can be treated without color dulling, and the particles are stably-dispersed without precipitation in the medium. The average particle size of the copolymer is measured by a dynamic light scattering device, an electron microscope, etc.

The solid content concentration of the emulsion is preferably from 20 to 40 mass % in the emulsion (100 mass %) immediately after the production of the copolymer. The solid content concentration means a concentration including not only the copolymer but also the emulsifier. The content of the copolymer in the emulsion is preferably from 18 to 40 mass % immediately after the production of the copolymer.

The solid content concentration of the water repellent composition of the present invention is preferably from 0.2 to 5 mass % in the water repellent composition (100 mass %) at the time of treating particles.

The solid content concentration of the emulsion or the water repellent composition is calculated based on the mass of the emulsion or the water repellent composition before heating and the mass of it after drying in the convection-drying machine at the temperature of 120° C. for 4 hours.

In the above-described water repellent composition of the present invention, by the presence of structural units based on the monomer (b), the orientation of a long-chain alkyl group in structural units based on the monomer (a) will be improved, whereby dynamic water repellency and after air-drying water repellency will be improved. Further, by the presence of structural units based on the monomer (b), the adhesive property of the water repellent composition of the present invention to an article and the strength of the coating film made of the water repellent composition of the present invention will be improved, whereby the friction durability will be improved.

Further, regarding the water repellent composition of the present invention, when no structural units based on the monomer (c) are present or the compound (1) is used as the monomer (c) or a purification degree of the copolymer and a polymerization conversion are quite high even if a $R^F$ group having at least 8 carbon atoms is present, the content (the content when the solid content concentration is 20%) of perfluorooctanic acid (PFOA), perfluorooctane sulfonate (PFOS), and their precursors and analogs, of which the effects on the environment have been pointed out, can be reduced to a level lower than the detection limit as an analysis value of LC-MS/MS by the method disclosed in Japanese Patent Application No. 2007-333564.

<Article>

The article of the present invention is an article treated with the water repellent composition of the present invention.

The article treated with the water repellent composition of the present invention may, for example, be fibers (natural fibers, synthetic fibers, blended fibers, etc.), various fiber products, non-woven fabrics, resins, paper, leather, metal, stone, concrete, plaster or glass.

The method for treating the article may, for example, be a method which comprises coating or impregnating the article with the water repellent composition by a known coating method, followed by drying.

When the article is treated with the water repellent composition of the present invention, it is possible to impart water repellency of high quality to the article. Further, the article has excellent adhesion on the surface, and water repellency can be imparted even by curing at a low temperature. Further, deterioration of the performance by friction or washing is small, and the initial performance at the treatment can be stably maintained. Further, paper treated with the water repellent composition of the present invention has excellent size property and water repellency even when it is dried under a low-temperature drying condition. Moreover, when resins, glass or surface of metals is treated with the water repellent composition of the present invention, a water repellent coating film which has good adhesion to an article and good film-forming property can be formed.

The above-described article of the present invention is excellent in dynamic water repellency, after air-drying water repellency and friction durability since the water repellent composition is used which can impart sufficient dynamic water repellency, after air-drying water repellency and friction durability to a surface of an article, and which has low impact on the environment.

EXAMPLES

Now, the present invention will be described in detail with reference to Examples. It should be understood, however, that the present invention is by no means limited to these Examples.

Examples 1, 2, 4 to 6, and 8 to 16 are Working Examples of the present invention, and Examples 3, 7 and 17 to 22 are Comparative Examples, and Example 23 is Reference Example.

<Properties of Copolymer>

The molecular weight of the copolymer recovered by the following recovery method was measured, and the composition of the copolymer was analyzed.

(Copolymer Recovery Method A)

6 g of an emulsion was concentrated to obtain a concentrated liquid wherein the solid content was in the order of 40 mass %. Approximately 10 g of tetrahydrofuran (hereinafter referred to as THF) was dropwise added to the concentrated liquid, and the solid in the liquid was dissolved to obtain a THF solution. If the solid was hardly dissolved, the liquid was exposed to ultrasound. The THF solution was dropwise added to 60 g of methanol, followed by stirring to let solid precipitate. The obtained solid was collected by filtration under reduced pressure. Then, it was dried under vacuum at a temperature of 35° C. overnight to obtain a copolymer.

(Copolymer Recovery Method B)

6 g of an emulsion was dropwise added to 60 g of 2-propanol (hereinafter referred to as IPA), followed by stirring to let solid precipitate. After centrifuging at 3,000 rpm for 5 minutes, the obtained solid was decanted. Then, 12 g of IPA was added and stirred well. After centrifuging at 3,000 for 5 minutes, the obtained solid was separated from the supernatant and dried under vacuum at a temperature of 35° C. overnight to obtain a copolymer.

(Molecular Weight)

The recovered copolymer was dissolved to obtain a 0.5 mass % THF solution, and the solution was filtrated through a 0.45 μm filter to obtain a sample for analysis. With respect to the sample, the number average molecular weight (Mn) and the weight average molecular weight (Mw) were measured. The measurement conditions were as follows:

Device: HLC-8220GPC, manufactured by TOSOH Corporation,

Columns: 4 columns of TSKgel superHZ4000, superHZ3000, superHZ2500 and superHZ2000 connected in series, Measurement temperature: 40° C., Injection volume: 40 μL, Discharge rate: 0.35 mL/min, Eluent: THF, Standard sample: EasiCal PS-2, manufactured by Polymer Laboratories Ltd.

Further, in Example 20, the molecular weight was measured as follows:

The recovered copolymer was dissolved in a mixed solvent of a fluorinated solvent (AK-225, manufactured by Asahi Glass Company, Limited)/THF=6/4 (volume ratio) to obtain a 1 mass % solution, and the solution was filtered through a 0.2 μm filter to obtain a sample for analysis. The measurement conditions were as follows:

Device: HLC-8220GPC, manufactured by TOSOH Corporation,

Columns: MIXED-C and 100A connected in series, manufactured by Polymer Laboratories Ltd., Measurement temperature: 37° C., Injection volume: 50 μL, Discharge rate: 1 mL/min, Standard sample: EasiCal PM-2, manufactured by Polymer Laboratories Ltd., Eluent: a mixed solvent of a fluorinated solvent (AK-225, manufactured by Asahi Glass Company, Limited)/THF=6/4 (volume ratio)

(Copolymer Composition)

$^{19}$F-NMR, $^{13}$C-NMR, heat decomposition GC/MS and automatic combustion system-ion chromatography were used for the analysis of the copolymer composition.

From $^{19}$F-NMR analysis, information about the chain length of structural units based on the monomer (c) may be obtained. From $^{13}$C-NMR analysis, information about structural units based on the hydrocarbon monomer may be obtained. Further, a peak of structural units based on the monomer (a) was observed around from 10 to 35 ppm. A peak of structural units based on vinyl chloride was observed around 45 ppm and 56 ppm. A peak of structural units based on the monomer (c) was observed around from 105 to 120 ppm.

From GC/MS analysis, it is possible to obtain a detailed structure of structural units based on the monomers contained in the copolymer.

By automatic combustion system-ion chromatography analysis, F amount and Cl amount in the copolymer were quantified. The content of structural units based on the monomer (c) may be calculated based on F amount. Further, the content of structural units based on the monomer (b) may be calculated based on Cl amount.

The conditions for each analysis are as follows:

(NMR)
Device: ECP-400, manufactured by JEOL Ltd.,
Sample: CDCl$_3$ solution of 5 mass % copolymer,
External standard of $^{19}$F-NMR: 1,1,2-trichloro-1,2,2-trifluoroethane,
Measurement temperature: room temperature (Heat Decomposition Gc/Ms)
(Heat Decomposition Condition)
Device: Double-Shot Pyrolyzer PY-2020iD, manufactured by Frontier Laboratories,
Heat decomposition temperature: 600° C.

(GC/MS Conditions)
Device: HP-5890, manufactured by Hewlett-Packard/SX-102A, manufactured by JEOL Ltd.,
Column: DB-5 (30 m, 0.25 mm φ, 0.25 μm), manufactured by J&W Scientific Inc.,
Column top pressure: 8 psi,
Temperature condition: 40° C. (3 minutes)→320° C. (15 minutes), 20° C./min,
Injection inlet temperature: 300° C.,
Ion source temperature: approximately 180° C.,
Spit ratio: (100:1),
Ionization method: EI+,
Sample amount: 100 μg (GC Conditions)
Device: 6890N, manufactured by Agilent Technologies,
Column: DB-5 (30 m, 0.25 mm φ, 0.25 μm), manufactured by J&W Scientific Inc.,
Column flow volume: 1.0 mL/min,
Temperature condition: 40° C. (3 minutes)→320° C. (15 minutes), 20° C./min,
Detector: FID,
Injection inlet temperature: 300° C.,
Detector temperature: 320° C.,
Split ratio: (50:1),
Sample amount: 100 μg (Automatic Combustion System-Ion Chromatography (AQF-IC Method))
(Automatic Sample Combustion System)
Device: automatic sample combustion system AQF-100, manufactured by DIA Instruments Co., Ltd.,
Combustion condition: solid sample mode,
Sample amount: 2 to 20 mg (Ion Chromatography)
Device: manufactured by Dionex Corporation,
Column: IonpacAG12A+IonpacAS12A,
Eluent: 2.7 mM-Na$_2$CO$_3$/0.3 mM-NaHCO$_3$,
Flow rate: 1.3 mL/min,
Suppressor: ASRS,
Detector: conductivity detector,
Injection volume: 5 μL <Evaluation of Test Cloth>
(Water Repellency)

With respect to a test cloth, water repellency was evaluated in accordance with the spray test of JIS L1092-1992. Water repellency was represented by 5 grades of from 1 to 5. The larger the numerical value, the better the water repellency. Grade 3 or higher is regarded as having water repellency. +(−) besides the grade means that the property is slightly better (worse).

(Wash Durability)

The test cloth was washed repeatedly for 20 times or 50 times in accordance with the water-wash method of Annex Table 103 in JIS L0217. After the washing, it was dried in a room at a room temperature of 25° C. under a humidity of 60% overnight, and then the water repellency was measured.

(Oil Repellency)

With respect to the test cloth, oil repellency was evaluated in accordance with the test method of AATCC-TM118-1966. Oil repellency was represented by the grades listed in Table 1. +(−) besides the grade means that the property is slightly better (worse).

TABLE 1

| Oil repellency No. | Test liquid | Surface tension mN/m (25° C.) |
| --- | --- | --- |
| 8 | n-heptane | 20.0 |
| 7 | n-octane | 21.8 |
| 6 | n-decane | 23.5 |
| 5 | n-dodecane | 25.0 |
| 4 | n-tetradecane | 26.7 |
| 3 | n-hexadecane | 27.3 |
| 2 | Nujol 65 parts/ hexadecane 35 parts | 29.6 |
| 1 | Nujol | 31.2 |
| 0 | Oil repellency less than that of No. 1 | — |

(Wash Durability)

The test cloth was washed repeatedly for 20 times in accordance with the water-wash method of Annex Table 103 in JIS L0217. Then, it was dried in a room at a room temperature of 25° C. under a humidity of 60% overnight, and then the oil repellency was evaluated.

(Dynamic Water Repellency)

With respect to the test cloth, water repellency was evaluated in accordance with the method described in JIS L1092 (C) (Bundesmann test) by a rainfall test under such condition that rainfall amount was 100 cc/min, rainfall temperature was 20° C. and testing time was 10 minutes. Water repellency was represented by 5 grades of from 1 to 5. The higher the grade, the better the water repellency. The cloth of grade 3 or higher is regarded to have water repellency. +(−) beside the grade means that the property is slightly better (worse).

(Wash Durability)

The test cloth was washed repeatedly for 20 times or 50 times in accordance with the water-wash method of Annex Table 103 in JIS L0217. Then, it was dried in a room at a room temperature of 25° C. under a humidity of 50% overnight, and then the dynamic water repellency was evaluated.

(Dry Friction Durability)

With respect to the test cloth, a friction test was carried out by using Martindale abrasion tester (JAMES H. HEAL & Co. LTD.). The number of friction was set as 1,000 times.

After the friction test, the dynamic water repellency was evaluated.

(Wet Friction Durability)

0.5 mL of distilled water was dropped on a surface of the test cloth, and then a wet friction test was carried out in the same manner as in the above friction test. The number of friction was set as 500 times, and 0.5 mL of distilled water was dropped on a surface of the test cloth after each of 125, 250, 375 times of friction to maintain the wet condition during friction.

After the wet friction test, the above dynamic water repellency was evaluated.

(Abbreviations)

Monomer (a):
  BeA: behenyl acrylate,
  BeMA: behenyl methacrylate
Monomer (b):
  VCM: vinyl chloride,
  VdCl: vinylidene chloride
Monomer (c):
  CmFA: $F(CF_2)_mCH_2CH_2OC(O)CH=CH_2$ (a mixture of the compounds of this formula, wherein m is from 6 to 16, the content of the compound having m of at least 8 is at least 99 mass % and the average value of m is 9),
  C6FMA: $C_6F_{13}C_2H_4OC(O)C(CH_3)=CH_2$,
  C6FA: $C_6F_{13}C_2H_4OC(O)CH=CH_2$,
  αClC6: $C_6F_{13}C_2H_4OC(O)CCl=CH_2$,
  C8FA: an acrylate having a $C_8R^F$ group
Monomer (d):
  D-BI: a 3,5-dimethylpyrazole adduct of 2-isocyanate ethyl methacrylate (the following formula (5)),
  NMAM: N-methylolacrylamide,
  HEMA: 2-hydroxyethyl methacrylate,
  FM-4: methacrylic acid ester of polycaprolactone oligomer (PLACCEL FM-4, manufactured by DAICEL CHEMICAL INDUSTRIES, LTD., average molecular weight 586)

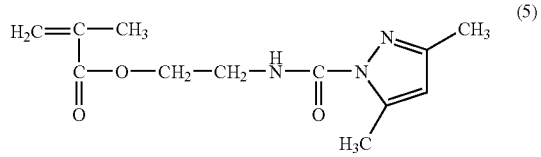 [SMILES: C=C(C)C(=O)OCCNC(=O)n1nc(C)cc1C]

Monomer (e):
  STA: stearyl acrylate,
  DOM: dioctyl maleate
Molecular Weight Modifier:
  NR1: 1,3,5-tris(3-mercaptobutyloxyethyl)-1,3,5-triazine-2,4,6(1H,3H,5H)-trione (Karenz NR1, manufactured by Showa Denko K.K.),
  nDOSH: n-dodecylmercaptane
Surfactant $s^1$:
  PEO-20: a 10 mass % aqueous solution of polyoxyethylene oleyl ether (EMULGEN E430, manufactured by Kao Corporation, and about 26 mol adduct of ethylene oxide),
  SFY465: a 10 mass % aqueous solution of a 2,4,7,9-tetramethyl-5-decin-4,7-diol ethylene oxide adduct (Surfynol 465, manufactured by NISSIN CHEMICAL INDUSTRY CO., LTD., 10 mol addition of ethylene oxide)
Surfactant $s^7$:
  TMAC: a 10 mass % aqueous solution of monostearyltrimethylammonium chloride (Arquade 18-63, manufactured by Lion Corporation)
Surfactant $s^3$:
  P-204: A 10 mass % aqueous solution of ethylene oxide/propylene oxide polymer (Pronon 204, manufactured by NOF CORPORATION, the content of ethylene oxide is 40 mass %)
Polymerization Initiator:
  VA-061A: a 10 mass % aqueous solution of acetate of 2,2'-azobis[2-(2-imidazoline-2-yl)propane] (VA-061, manufactured by Wako Pure Chemical Industries, Ltd.)
Medium:
  DPG: dipropylene glycol,
  Water: deionized water Example 1

162.8 g of BeA, 2.8 g of HEMA, 2.8 g of nDOSH, 69.0 g of PEO-20, 13.8 g of TMAC, 13.8 g of P-204, 82.8 g of DPG and 328.3 g of water were put into a glass beaker, heated at 60° C. for 30 minutes and then mixed by a homomixer (BIO MIXER, manufactured by Nippon Seiki Co., Ltd.) to obtain a mixed solution.

The obtained mixed solution was treated by a high-pressure emulsification equipment (Mini-Lab, manufactured by APV Rannie) at 60° C. and 40 MPa to obtain an emulsion. 800 g of the obtained emulsion was put into a stainless steel reactor and cooled to 40° C. or lower. 13.8 g of VA-061A was added to the emulsion, and the gas phase was replaced with nitrogen, and then 110.3 g of VCM was introduced. The polymerization reaction of the reaction mixture was conducted with stirring at 60° C. for 15 hours to obtain an emulsion of the copolymer. The recovery method and the recovery rate of the copolymer, the molecular weight of the copolymer and the contents of the respective monomers in the monomer mixture are shown in Table 5.

Examples 2 to 21 and 23

An emulsion of the copolymer was obtained in the same manner as in Example 1 except that the amounts of the respective materials charged were changed as shown in Table 2 and Table 3. The recovery method and the recovery rate of the copolymer, the molecular weight of the copolymer and the contents of the respective monomers in the monomer mixture are shown in Table 4 and Table 5.

Further, in some Examples, the composition of the copolymer was analyzed. The contents of the respective structural units in the copolymer are shown in Table 4 and Table 5. AA in the Table indicates a value based on 100-[the content of structural units based on the monomer (b) (calculated value)+ the content of structural units based on the monomer (c) (calculated value)]. The calculated values roughly coincide with the charged ratio, which suggests that the structural units are contained in the copolymer in amounts corresponding to charged amounts of the monomers.

Example 22

137.9 g of C6FMA, 110.3 g of STA, 2.8 g of HEMA, 2.8 g of nDOSH, 69.0 g of PEO-20, 13.8 g of TMAC, 13.8 g of P-204, 82.8 g of DPG and 328.3 g of water were put into a glass beaker, heated at 55° C. for 30 minutes and then mixed by a homomixer (BIO MIXER, manufactured by Nippon Seiki Co., Ltd.) to obtain a mixed solution.

The obtained mixed solution was treated by a high-pressure emulsification equipment (Mini-Lab, manufactured by APV Rannie) at 50° C. and 40 MPa to obtain an emulsion. 800 g of the obtained emulsion was put into a glass reactor and cooled to 30° C. or lower. 24.8 g of VdCl and 13.8 g of VA061-A were added to the emulsion, and the gas phase was replaced with nitrogen. Then, the polymerization reaction of the reaction mixture was conducted with stirring at 65° C. for 15 hours to obtain an emulsion of the copolymer. The recovery method and the recovery rate of the copolymer, the molecular weight of the copolymer and the contents of the respective monomers in the monomer mixture are shown in Table 5.

TABLE 2

| | Charged amount (g) | Example 1 | 2 | 3 | 4 | 5 | 6 | 7 | 8 | 9 | 10 | 11 | 12 |
|---|---|---|---|---|---|---|---|---|---|---|---|---|---|
| (c) | CmFA | | | | | | | | | | | | |
| (c) | C6FMA | | 55.2 | 162.8 | | 49.1 | 49.1 | 217.9 | 42.2 | | | 21.5 | 42.8 |
| (c) | C6FA | | | | | | | | | | 42.2 | | |
| (c) | α ClC6 | | | | | | | | | | | 49.1 | |
| (c) | C8FA | | | | | | | | | | | | |
| (e) | STA | | | | | | | | | | | | |
| (a) | BeA | 162.8 | 107.6 | | 213.2 | 166.1 | | | 165.5 | 165.5 | 166.1 | 189.0 | 167.5 |
| (a) | BeMA | | | | | | 166.1 | | | | | | |
| (b) | VCM | 110.3 | 110.3 | 110.3 | 55.2 | 57.9 | 57.9 | 55.2 | 57.9 | 57.9 | 57.9 | 57.9 | 58.6 |
| (b) | VdCl | | | | | | | | | | | | |
| (d) | D-BI | | | | | | | | | | | | |
| (e) | DOM | | | | | | | | | | | | |
| (d) | NMAM | | | | 7.4 | | | 7.4 | 7.4 | | | 7.4 | 7.5 |
| (d) | HEMA | 2.8 | 2.8 | 2.8 | | 2.8 | 2.8 | 2.8 | 2.8 | 2.8 | 2.8 | | |
| (d) | FM-4 | | | | | | | | | | | | |
| — | NR1 | | | | | | | | | | | | 1.2 |
| — | nDOSH | 2.8 | 2.8 | 2.8 | 2.8 | 2.8 | 2.8 | 2.8 | 2.8 | 2.8 | 2.8 | 2.8 | |
| $s^1$ | PEO-20 | 69.0 | 69.0 | 69.0 | 69.0 | 69.0 | 69.0 | 69.0 | 69.0 | 69.0 | 69.0 | 69.0 | 69.1 |
| $s^1$ | SFY465 | | | | | | | | | | | | |
| $s^7$ | TMAC | 13.8 | 13.8 | 13.8 | 13.8 | 13.8 | 13.8 | 13.8 | 13.8 | 13.8 | 13.8 | 13.8 | 13.8 |
| $s^3$ | P-204 | 13.8 | 13.8 | 13.8 | 13.8 | 13.8 | 13.8 | 13.8 | 13.8 | 13.8 | 13.8 | 13.8 | 13.8 |
| — | VA-061A | 13.8 | 13.8 | 13.8 | 13.8 | 13.8 | 13.8 | 13.8 | 13.8 | 13.8 | 13.8 | 13.8 | 13.8 |
| — | Water | 82.8 | 82.8 | 82.8 | 82.8 | 82.8 | 82.8 | 82.8 | 82.8 | 82.8 | 82.8 | 82.8 | 82.9 |
| — | DPG | 328.3 | 328.3 | 328.3 | 328.3 | 328.3 | 328.3 | 328.3 | 328.3 | 328.3 | 328.3 | 328.3 | 328.9 |

TABLE 3

| | Charged amount (g) | Example 13 | 14 | 15 | 16 | 17 | 18 | 19 | 20 | 21 | 22 | 23 |
|---|---|---|---|---|---|---|---|---|---|---|---|---|
| (c) | CmFA | | | | | | | | | | | 186.7 |
| (c) | C6FMA | 42.3 | 41.4 | 72.6 | | | 69.0 | 204.1 | 273.1 | 204.1 | 137.9 | |
| (c) | C6FA | | | | | | | | | | | |
| (c) | α ClC6 | | | | | | | | | | | |
| (c) | C8FA | | | | 49.1 | | | | | | | |
| (e) | STA | | | | | | | | | | 35.9 | 110.3 |
| (a) | BeA | 165.8 | 165.9 | 137.9 | 165.6 | 273.1 | 204.1 | 69.0 | | | | |
| (a) | BeMA | | | | | | | | | | | |
| (b) | VCM | 58.0 | 58.0 | 57.9 | 58.0 | | | | | 24.8 | | 56.0 |
| (b) | VdCl | | | | | | | | | | 24.8 | |
| (d) | D-BI | | | | | | | | | 11.0 | | |
| (e) | DOM | | | | | | | | | | | 16.8 |
| (d) | NMAM | 7.5 | 7.5 | 7.4 | | | | | | | | 7.2 |
| (d) | HEMA | 2.8 | | | 2.8 | 2.8 | 2.8 | 2.8 | 2.8 | | 2.8 | |
| (d) | FM-4 | | 2.8 | | | | | | | | | |
| — | NR1 | 1.2 | | | | | | | | | | |
| — | nDOSH | | 2.8 | 2.8 | 2.8 | 2.8 | 2.8 | 2.8 | 2.8 | 2.8 | 2.8 | 2.7 |
| $s^1$ | PEO-20 | 69.1 | 69.0 | 69.0 | 69.0 | 69.0 | 69.0 | 69.0 | 69.0 | 69.0 | 69.0 | 96.0 |
| $s^1$ | SFY465 | | | | | | | | | | | 10.7 |
| $s^7$ | TMAC | 13.8 | 13.8 | 13.8 | 13.8 | 13.8 | 13.8 | 13.8 | 13.8 | 13.8 | 13.8 | |
| $s^3$ | P-204 | 13.8 | 13.8 | 13.8 | 13.8 | 13.8 | 13.8 | 13.8 | 13.8 | 13.8 | 13.8 | 13.3 |
| — | VA-061A | 13.8 | 13.8 | 13.8 | 13.8 | 13.8 | 13.8 | 13.8 | 13.8 | 13.8 | 13.8 | 13.3 |
| — | Water | 82.9 | 82.8 | 82.8 | 82.8 | 82.8 | 82.8 | 82.8 | 82.8 | 82.8 | 82.8 | 80.0 |
| — | DPG | 328.9 | 328.5 | 328.5 | 328.5 | 328.3 | 328.3 | 328.3 | 328.3 | 328.3 | 328.3 | 317.3 |

TABLE 4

| | Example | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Content (mass %) of each monomer in monomer mixture (100 mass %) | | | | | | | | | | | | |
| (a) | 59 | 39 | 0 | 77 | 60 | 60 | 0 | 60 | 60 | 60 | 68.5 | 60.6 |
| (b) | 40 | 40 | 40 | 20 | 21 | 21 | 20 | 21 | 21 | 21 | 21 | 21.2 |
| (c) | 0 | 20 | 59 | 0 | 18 | 18 | 79 | 15 | 15 | 18 | 7.8 | 15.5 |
| (d) | 1 | 1 | 1 | 3 | 1 | 1 | 1 | 4 | 4 | 1 | 2.7 | 2.7 |
| (e) | O | O | 0 | O | O | O | O | O | O | O | O | O |
| (a) + (b) | 99 | 79 | 40 | 97 | 81 | 81 | 20 | 81 | 81 | 81 | 89.5 | 81.8 |
| Content (mass %) of each structural unit in total structural units of copolymer (mass %) | | | | | | | | | | | | |
| (c) | | | 53.1 | | 16.6 | | | 15.9 | 14.6 | 15.8 | 7.4 | |
| AA | | | 0.5 | | 58 | | | 60.3 | 61.8 | 64.2 | 64.8 | |
| (b) | | | 46.5 | | 25.4 | | | 23.8 | 23.6 | 20 | 27.9 | |
| Recovery method | | | A | | A | | | B | A | A | | |
| Recovery rate (%) | | | 83 | | 89 | | | 87 | 90 | 90 | | |
| Mn | 17158 | 18963 | 12660 | | 15211 | 13097 | 28478 | 13300 | 14416 | 27040 | 11121 | |
| Mw | 102207 | 119556 | 70189 | | 73084 | 45027 | 54990 | 64549 | 118018 | 144456 | 64448 | |
| Mw/Mn | 6.0 | 6.3 | 5.5 | | 4.8 | 3.4 | 1.9 | 4.9 | 8.2 | 5.3 | 5.8 | |

TABLE 5

| | Example | | | | | | | | | | |
|---|---|---|---|---|---|---|---|---|---|---|---|
| | 13 | 14 | 15 | 16 | 17 | 18 | 19 | 20 | 21 | 22 | 23 |
| Content (mass %) of each monomer in monomer mixture (100 mass %) | | | | | | | | | | | |
| (a) | 60 | 60 | 50 | 60 | 99 | 74 | 25 | 0 | 0 | 0 | 0 |
| (b) | 21 | 21 | 21 | 21 | 0 | 0 | 0 | 0 | 9 | 9 | 21 |
| (c) | 15 | 15 | 26 | 18 | 0 | 25 | 74 | 99 | 74 | 50 | 70 |
| (d) | 4 | 4 | 3 | 1 | 1 | 1 | 1 | 1 | 4 | 1 | 3 |
| (e) | O | O | O | O | O | O | O | O | 13 | 40 | 6 |
| (a) + (b) | 81 | 81 | 71 | 81 | 99 | 74 | 25 | 0 | 9 | 9 | 21 |
| Content (mass %) of each structural unit in total structural units of copolymer (mass %) | | | | | | | | | | | |
| (c) | | | 18.1 | | | 23.5 | 72.3 | | | | |
| AA | | | 57.2 | | | 76.5 | 27.7 | | | | |
| (b) | | | 24.7 | | | 0 | 0 | | | | |
| Recovery method | | | A | | | A | A | | | | |
| Recovery rate (%) | | | 87 | | | 91 | 71 | | | | |
| Mn | | 12340 | 14270 | 10327 | 9482 | 5915 | | 20972 | | 15756 | 11490 |
| Mw | | 67105 | 73775 | 25961 | 18389 | 8992 | | 31291 | | 27861 | 27783 |
| Mw/Mn | | 5.4 | 5.2 | 2.5 | 1.9 | 1.5 | | 1.5 | | 1.8 | 2.4 |

<Evaluation of Test Cloth>

After the copolymer emulsions of Examples 1 to 23 were diluted with distilled water to adjust the solid content concentration to 1.0 mass %, trimethylol melamine resin (manufactured by Dainippon Ink and Chemicals, Inc., BECKAMINE M-3) as a thermosetting agent and an organic amine salt catalyst (manufactured by Dainippon Ink and Chemicals, Inc., BECKAMINE ACX) as a thermosetting catalyst were added so that each concentration would be 0.3 mass %, and then auxiliary agent used in combination shown in Table 5 was added so that its concentration would be 0.8 mass % to obtain a water repellent composition.

Further, TP-10 was blocked isocyanate (Meikanate TP-10, manufactured by Meisei Chemical Works, Ltd.) and S-7 was a HDI nurate type cross-linking agent prepared based on Example 4 of JP-A-2002-511507.

A dyed nylon-cloth was dipped in the water repellent composition, and the cloth was nipped to a wet pick-up of 60 mass %. The cloth was dried at 110° C. for 90 seconds and then dried at 170° C. for 60 seconds to obtain a test cloth. Water repellency (after air-drying water repellency), oil repellency, dynamic water repellency and friction durability of the test cloth were evaluated. The results are shown in Table 6 and Table 7.

TABLE 6

| | Auxiliary agent used in combination | Base cloth Nylon Evaluation | | | | | | | | |
|---|---|---|---|---|---|---|---|---|---|---|
| | | Oil repellency | | | Water repellency | | | Bundesmann test | | |
| | | Frequency of washing | | | | | | | | |
| | — | 0 | 20 | 50 | 0 | 20 | 50 | 0 | 5 | 20 |
| Ex. 1 | TP-10 | 1 | O | O | 5− | 3+ | 3 | 4.5 | 3.5 | 3 |
| Ex. 2 | TP-10 | 2 | O | O | 5− | 4+ | 4 | 4.5 | 4− | 3+ |
| Ex. 3 | TP-10 | 4− | 3− | 2− | 5− | 4 | 4 | 3− | 2.5 | — |
| Ex. 4 | TP-10 | O | O | O | 5− | 4 | 3 | 4+ | 4 | 4 |
| Ex. 5 | TP-10 | 3 | O | O | 4+ | 4 | 4 | 5− | 4 | 4+ |
| Ex. 6 | TP-10 | 2 | O | O | 5− | 4− | 3 | 3+ | 3− | — |
| Ex. 7 | TP-10 | 4− | 3− | 2− | 5− | 4 | 3+ | 3.5 | 2.5 | — |
| Ex. 8 | TP-10 | 2 | 1− | O | 5 | 5− | 4 | 5− | 4.5 | 4+ |
| Ex. 9 | TP-10 | 1 | O | O | 5− | 4 | 4− | 4.5 | 4+ | 4 |
| Ex. 10 | TP-10 | 3 | 1− | O | 5 | 4+ | 3− | 4.5 | 3 | 2 |
| Ex. 11 | TP-10 | O | O | O | 5− | 4+ | 4− | 4.5 | 4− | 4− |
| Ex. 12 | S-7 | 2− | O | O | 5− | 4 | 3− | 5− | 4.5 | 4 |
| Ex. 13 | S-7 | 2 | O | O | 5− | 4 | 4 | 5− | 4.5 | 4+ |
| Ex. 14 | TP-10 | 3− | 2− | O | 5 | 3 | 3 | 4+ | 4− | 4− |
| Ex. 15 | TP-10 | 5− | 2− | 1− | 5 | 4+ | 4− | 4 | 4− | 3.5 |
| Ex. 16 | TP-10 | 1 | O | O | 5− | 4 | 4− | 4 | 4− | — |
| Ex. 17 | TP-10 | 2− | O | O | 4 | 2 | O | 2− | 1 | — |
| Ex. 18 | TP-10 | 3− | O | O | 5− | 4− | 2+ | 4− | 2.5 | — |
| Ex. 19 | TP-10 | 4− | 2− | 2− | 5 | 4 | 3 | 4− | 2.5 | — |
| Ex. 20 | TP-10 | 3 | 1− | O | 5− | 2− | 1 | 4− | 1.2 | — |
| Ex. 21 | TP-10 | 6− | 4− | 2− | 5− | 4+ | 4− | 4− | 2.5 | — |
| Ex. 22 | S-7 | 3− | 2− | O | 5− | 4 | 3+ | 3 | 2 | — |
| Ex. 23 | — | 5− | 3− | 2− | 5 | 5− | 4 | 5 | 4.5 | 4+ |

TABLE 7

| | Bundesmann test | |
|---|---|---|
| | Wet friction 500 times | Friction 1,000 times |
| Ex. 8 | 4+ | 5 |
| Ex. 23 | 4 | 4+ |

INDUSTRIAL APPLICABILITY

The copolymer and the water repellent composition of the present invention are useful as a water repellent agent for fiber products (clothing items (sportswear, coats, blousons, work clothes, uniforms, etc.), bags, industrial materials, etc.), non-woven fabrics, leather items, stone materials, concrete building materials, etc. They are also useful as a coating agent for filtering materials and a surface-protecting agent. Further, they are useful also for an application to give water repellency wherein it is mixed with polypropylene, nylon, etc., and then molded and shaped into fibers.

The entire disclosure of Japanese Patent Application No. 2008-062541 filed on Mar. 12, 2008 including specification, claims and summary is incorporated herein by reference in its entirety.

What is claimed is:

1. A copolymer having structural units based on the following monomer (a) and structural units based on the following monomer (b), wherein the content of structural units based on the following monomer (a) is from 5 to 95 mass % in the total structural units, 100 mass %, the content of structural units based on the following monomer (b) is from 5 to 60 mass % in the total structural units, 100 mass %, and the sum of the contents of structural units based on the following monomer (a) and structural units based on the following monomer (b) is at least 70 mass % in the total structural units, 100 mass %:

monomer (a): a (meth)acrylate having no polyfluoroalkyl group and having a $C_{20-30}$ alkyl group;

monomer (b): at least one halogenated olefin selected from the group consisting of vinyl chloride, vinylidene chloride, tetrafluoroethylene and vinylidene fluoride.

2. The copolymer according to claim 1, which further has structural units based on the following monomer (c):

monomer (c): a monomer having a polyfluoroalkyl group.

3. The copolymer according to claim 2, wherein the monomer (c) is a compound of the following formula (1):

$$(Z-Y)_n X \quad (1)$$

wherein Z is a $C_{1-6}$ polyfluoroalkyl group or a group of the following formula (2), Y is a bivalent organic group or a single bond, n is 1 or 2, and X is one of groups of the following formulae (3-1) to (3-5) when n is 1, or one of groups of the following formulae (4-1) to (4-4) when n is 2;

$$C_iF_{2i+1}O(CFX^1CF_2O)_j CFX^2— \quad (2)$$

wherein i is an integer of from 1 to 6, j is an integer of from 0 to 10, and each of $X^1$ and $X^2$ is a fluorine atom or a trifluoromethyl group;

$$—CR=CH_2 \quad (3\text{-}1)$$

$$—COOCR=CH_2 \quad (3\text{-}2)$$

$$—OCOCR=CH_2 \quad (3\text{-}3)$$

$$—OCH_2\text{-}\phi\text{-}CR=CH_2 \quad (3\text{-}4)$$

$$—OCH=CH_2 \quad (3\text{-}5)$$

wherein R is a hydrogen atom, a methyl group or a halogen atom, and is a phenylene group;

—CH[—(CH$_2$)$_m$—CR=CH$_2$]—  (4-1)

—CH[—(CH$_2$)$_m$—COOCR=CH$_2$]—  (4-2)

—CH[—(CH$_2$)$_m$—OCOCR=CH$_2$]—  (4-3)

—OCOCH=CHCOO—  (4-4)

wherein R is a hydrogen atom, a methyl group or a halogen atom, and m is an integer of from 0 to 4.

4. The copolymer according to claim 2, wherein the content of structural units based on the monomer (c) is from 1 to 30 mass % in the total structural units, 100 mass %.

5. The copolymer according to claim 1, wherein the monomer (b) is vinyl chloride or vinylidene chloride.

6. The copolymer according to claim 1, which further has structural units based on the following monomer (d):

monomer (d): a monomer having no polyfluoroalkyl group and having a crosslinkable functional group.

7. The copolymer according to claim 6, wherein the content of structural units based on the monomer (d) is from 0.1 to 8 mass % in the total structural units, 100 mass %.

8. A water repellent composition which comprises the copolymer as defined in claim 1 and a medium.

9. The water repellent composition according to claim 8, which further contains a nonionic surfactant and a cationic surfactant.

10. An article treated with the water repellent composition as defined in claim 8.

11. A method for producing a copolymer, which comprises polymerizing a monomer mixture comprising the following monomer (a) and the following monomer (b) in a medium in the presence of a surfactant and a polymerization initiator, wherein the content of the monomer (a) is from 5 to 95 mass % in the total monomers, 100 mass %, the content of the monomer (b) is from 5 to 60 mass % in the total monomers, 100 mass %, and the sum of the contents of the monomer (a) and the monomer (b) is at least 70 mass % in the monomer mixture, 100 mass %:

monomer (a): a (meth)acrylate having no polyfluoroalkyl group and having a C$_{20-30}$ alkyl group;

monomer (b): at least one halogenated olefin selected from the group consisting of vinyl chloride, vinylidene chloride, tetrafluoroethylene and vinylidene fluoride.

12. The method for producing a copolymer according to claim 11, wherein the monomer mixture further contains the following monomer (c) and the content of the monomer (c) is from 1 to 30 mass % in the total monomers, 100 mass %:

monomer (c): a monomer having a polyfluoroalkyl group.

13. The method for producing a copolymer according to claim 11, wherein the monomer (b) is vinyl chloride or vinylidene chloride.

* * * * *